United States Patent [19]

Kahn et al.

[11] Patent Number: 5,175,772
[45] Date of Patent: Dec. 29, 1992

[54] AUTOMATED TEST FOR DISPLAYS USING DISPLAY PATTERNS

[75] Inventors: Peter A. Kahn; Arthur P. Lafond, Jr., both of Boynton Beach; Frank E. Fedak, North Lauderdale, all of Fla.

[73] Assignee: Motorola, Inc., Schamburg, Ill.

[21] Appl. No.: 636,801

[22] Filed: Jan. 2, 1991

[51] Int. Cl.⁵ .............................................. G06K 9/00
[52] U.S. Cl. ........................................ 382/1; 340/715; 358/406; 382/8
[58] Field of Search ...................... 382/8, 57, 3, 1, 34; 358/405, 406, 106, 107; 340/707, 703, 715; 324/501, 404

[56] References Cited

U.S. PATENT DOCUMENTS

| | | | |
|---|---|---|---|
| 4,020,463 | 4/1977 | Himmel | 382/3 |
| 4,379,292 | 4/1983 | Minato et al. | 340/703 |
| 4,633,326 | 12/1986 | Endoh et al. | 358/406 |
| 4,914,709 | 4/1990 | Rudak | 382/57 |
| 4,945,410 | 7/1990 | Walling | 358/406 |
| 5,003,405 | 3/1991 | Wulforst | 358/405 |

FOREIGN PATENT DOCUMENTS 58-54774  3/1983  Japan ..................... 358/405

Primary Examiner—Joseph Mancuso

[57] ABSTRACT

A test (100) for a receiver (200) having a display (220) that is controlled to produce a plurality of display patterns 3A–3E. The plurality of display patterns 3A–3E are measured and the measured display patterns 3F are compared with a reference value to determine the integrity of the display patterns 3A–3E.

26 Claims, 2 Drawing Sheets

AUTOMATED TEST FOR DISPLAYS USING DISPLAY PATTERNS

FIELD OF THE INVENTION

This invention relates in general to product testing, and more specifically to an automated display testing using a plurality of test patterns.

BACKGROUND OF THE INVENTION

With the advent of automation in the production environment, the number of products produced in automated factories have increased many fold within the past decade. This has culminated in most manufacturers and system designers feverishly focusing on further improvements in automation to obtain additional advantages in manufacturing efficiency. To be competitive, manufacturers must develop fast and efficient methods for testing the manufactured products.

One method of testing display units currently involves taking a series of pictures of the display unit in different selected display patterns. These pictures, when translated to a digital reference, should corresponds to a predetermined scale of values to ensure that the display unit is functioning properly. However, with this method, the number of required pictures (test screens) are substantial large resulting in a very time consuming period of testing. Additionally, when the contrast levels are near zero-level (e.g., low gray scale), the test unit generates errors because it cannot distinguish between the low gray-scale images and the noise resulting from specks from outside light or the liquid crystal display (LCD) not being flat.

Also, an unreasonable long delay usually results because the camera taking pictures of the display is not synchronized with the display unit displaying the test patterns. Thus, the camera may not be ready to take the picture when the display unit is displaying a test pattern, and vice versa. Any method of manual push-button interaction for controlling the display unit is undesirable, because the resulting contacts to the display may result in movements of the display, and such movements may cause errors.

Thus, what is needed is a synchronized automated method for testing display units that distinguishes between noise and the selected patterns of the display unit quickly and economically.

SUMMARY OF THE INVENTION

Briefly according to the invention, a test for a receiver having a display controlled to produce a plurality of display patterns on the display. The plurality of display patterns are measured and the measured display patterns are compared with a reference value to determine the integrity of the displayed patterns.

DESCRIPTION OF A PREFERRED EMBODIMENT

Figure 1:
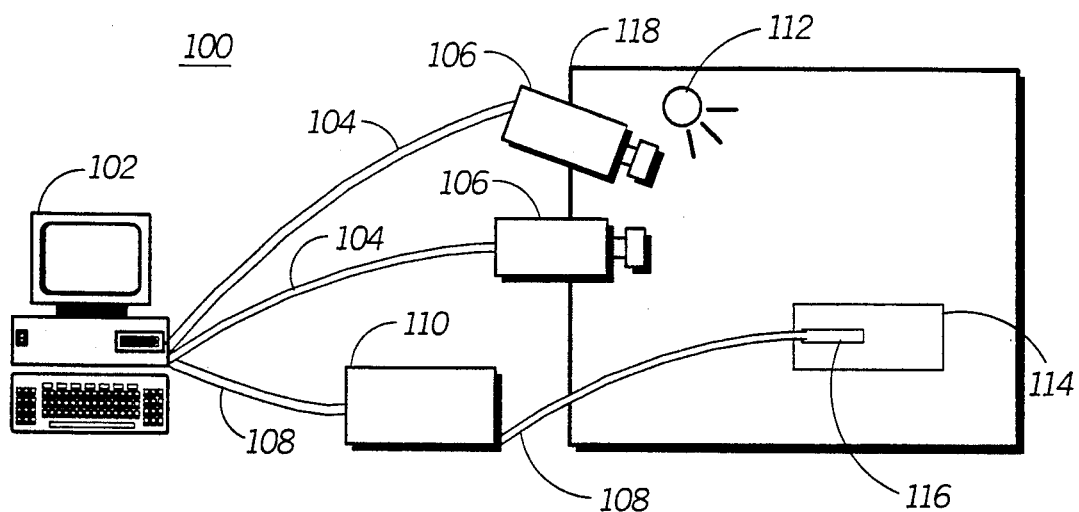
FIG. 1 is a block diagram of an automated test station for a receiver having a display in accordance with an embodiment of the present invention.

Referring to FIG. 1, an automated test is shown for testing a display unit on a receiver in accordance with the present invention. According to the invention, an automated test station 100 comprises a micro-computer (e.g., a personal computer, such as a Apple MacIntosh II computer) 102. The micro-computer 102 includes a program for controlling and synchronizing the automated test station 100. The micro-computer 102 also is coupled to a conventional image digitizer board (not shown) that is coupled to a least one camera 106. The at least one camera 106 is coupled to the image digitizer board via an RS-170 link 104 known to those skilled in the art. The RS-170 links 104 facilitates the transfer of control information from the micro-computer 102 to the at least one camera 106, and the transfer of images of the display from the at least one camera 106. The image digitizer board digitizes the image before it is delivered to the micro-computer 102. Those skilled in the art will appreciate that the image digitizer board is a specialized analog-to-digital converter. In this way, the images of the display are formatted to enable the micro-computer 102 to process the images to determined the integrity of the displayed patterns.

A high-frequency florescent light source 112 is included to produce an even background light on the display to minimized bright and/or dark spots or a to provide a constant lighting condition during the test. In this way, variations between different display patterns are minimized, thus reducing the errors occurring from bright or dark spots resulting from uneven light source or changes in the background light conditions.

The micro-computer 102 is also coupled to a vacuum enclosure 114 via an RS-232 link 108. The vacuum enclosure 114 houses a receiver (shown in FIG. 2) to be tested. Specifically according to this test, the voltage delivered from the micro-computer 102 is +/−15 volts, and the operating voltage of the receiver (e.g., a selective call receiver) 200 is typically 3 volts. To facilitate the coupling between the receiver 200 and the micro-computer 102, a level-shifter board 110 is provided, and those skilled in the art will appreciated that the level-shifter board 110 is used to convert the +/−15 volts to 3 volts. The termination of the RS-232 link 108, on the receiver side, comprises a Serial Communication Interface (SCI) port 116 that couples to the receiver 200. The details of the receiver 200 and the SCI port 116 are shown in FIG. 2.

Figure 2:
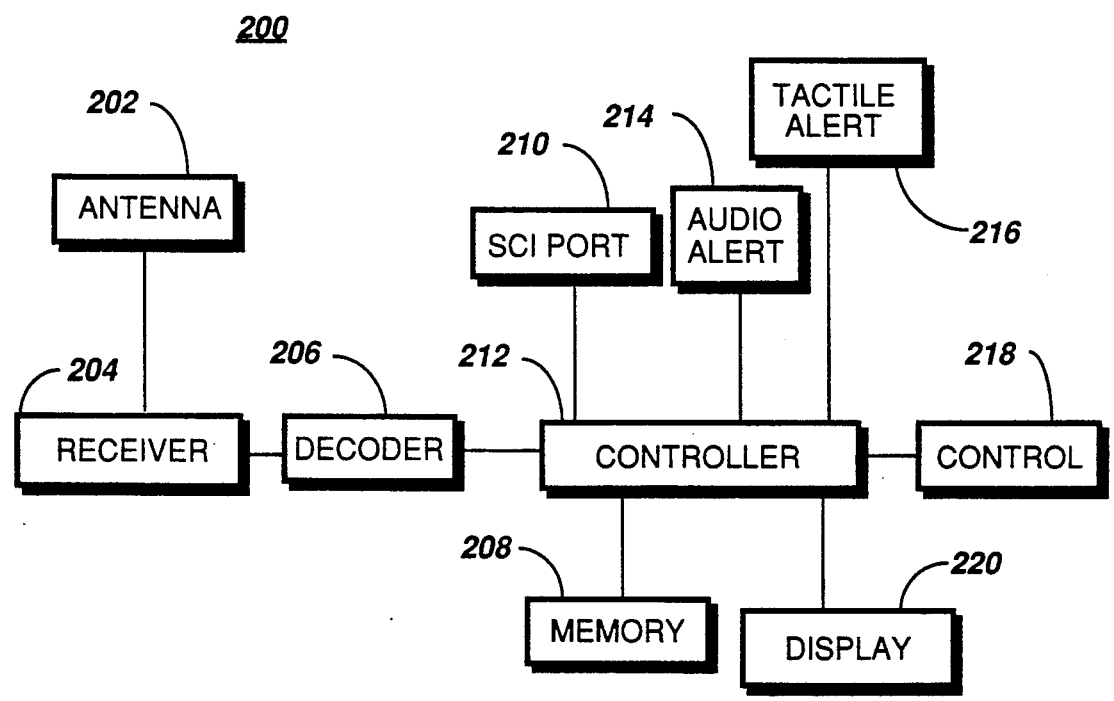
FIG. 2 is a detailed block diagram of a conventional receiver to be tested according to FIG. 1.

Referring to FIG. 2, a receiver, for example, a selective call radio receiver 200 (e.g., a pager) comprises an antenna 202 that provides a radio frequency (RF) carrier signal that is mixed with a local oscillator signal contained within a receiver module 204. The receiver module 204 generates a recovered signal suitable for processing by a decoder 206 in a manner well known to those skilled in the art. The decoder 206 processes the received signal to a decode an address. A controller 212 compares the decoded address with one or more predetermined addresses contained in a memory 208. When the addresses are substantially similar, the user is alerted that a signal has been received either by an audio alert (e.g., a speaker or transducer) 214 or a tactile alert (e.g., a vibrator) 216. The received signal may also include optional message data directed to some selective call receivers. For a message selective call receiver, the recovered message is stored in a memory 108 for subsequent presentation by a display 220. The display 220 will automatically, or when manually selected by controls 118, presents the message, such as by displaying the message on the display 220.

The SCI port 110 on the receiver 200 is provided to receive a transmitted (i.e., a downloaded) control program from the micro-computer 102 (FIG. 1). With this downloaded control program and the RS-232 link 108, the micro-computer 102 can synchronize the displaying of a plurality of display patterns (shown in FIG. 3) to quickly and efficiently receive an image of the display 120. In this way, the display test patterns (shown in FIG. 3A-E) may be changed easily without any changes to the receiver 200. That is, changes in the downloaded program is sufficient to change the operation and control to the receiver 220. Additionally, the micro-computer 102 controls the at least one camera 106 to provide an image of the display 220 and the receiver 200 to display the appropriate display pattern. In this way, the receiver 200 is controlled without a physical operation of the receiver's control buttons, this prevents movements of the receiver 200 that may cause error in the images of the display patterns.

According to the invention, the vacuum enclosure 114 facilitates holding the receiver 200 in place, and according to this embodiment, the receiver 200 is held at ninety degree with respect to the horizontal plane to enable a the image to be produced easily. Furthermore, because the enclosure 114 is operated by a vacuum, the resulting movements do not disturb the display 220 significantly to produce errors in the provided images.

The receiver 200, the high frequency light source 112, and the at least one camera 106 are contained in a vision enclosure 118 that is preferably a sound proof enclosure 118. The vision enclosure 118 allows the receiver 200 to be placed and replaced by a robotic or automatic operation. In this way, this vision enclosure 118 permits the testing procedure to be done without human intervention, thereby reducing delays that may be caused by constant repositioning of the receiver 200 to provide images of the display.

Figure 3A:
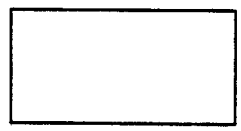
FIG. 3A-F shows the reference display and the display patterns that are used to determine the integrity of the display of the receiver shown in FIG. 2.
Figure 3D:
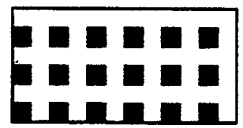
Figure 3B:
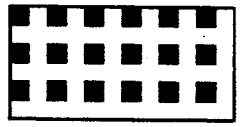
Figure 3E:
Figure 3C:
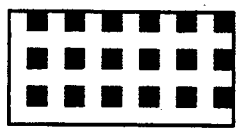
Figure 3F:
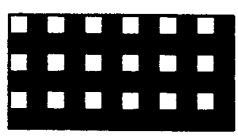

Referring to FIG. 3A-F, a plurality of display patterns are shown in accordance with the present invention. FIG. 3A shows a display of a blank screen used as a reference display which is compared with the pre-determined display patterns shown in FIGS. 3B-E to determine the integrity of the display 220.

According to the invention, the downloaded program synchronizes the receiver 200 to the test station 100 and cause the receiver 200 to display a reference display (FIG. 3A). An image of the reference display is provided to the micro-computer 102 via a camera 106 as discussed above. Subsequently, a display pattern (FIG. 3B) is displayed accordingly on the receiver 200, and an image of the displayed pattern is provided to the micro-computer 102. An analysis is performed on the reference image (in FIG. 3A) and the images of a plurality of display patterns (shown in FIG. 3B-E). The receiver 200 sequences through the pre-determined display patterns and an image is individually produced and stored in the micro-computer 102 to compute a resultant image from the reference image. Specifically, each individual display pattern is preferably substracted from the image of the reference display. In this way, lighting errors and noise appearing on the reference display will similarly be present in the display patterns. Thus, the analysis (i.e., computed substraction) will remove the errors because the errors appear on all the display patterns, because the images are produces immediately of each other. An absolute value of the resultant image is subsequently computed (shown in FIG. 3F) to provide a resultant image having positive values. For example, an analysis is subsequently performed on FIG. 3F, the absolute value of the resultant images by the micro-computer 102. Those skilled in the art will appreciate that this test will readily determine the contrast, the size, and the position of varying patterns of illuminations (shown as white squares in FIG. 3F).

The absolute value of the resultant image is determined between the reference display (FIG. 3A) and the plurality of display patterns (FIG. 3B-E). That is, according to present embodiment, four absolute values of the resultant images are computed for each receiver to be tested. However, there is no limitation to the number of test patterns, this any limitation will determined by time of the test and the extensiveness of the desired test. The steps described above are repeated for test patterns 3C-3E.

That is, four absolute values of the resultant images are subjected to the test. The result of the test is compared with a pre-determined value stored in the micro-computer to determine the integrity of the display.

In this way, the receiver 200 is controlled to produced a series of displayed patterns of which at least one camera is used to provide images of the displayed patterns to the micro-computer 102. An analysis removes errors and the absolute value analysis calculates and compare the resultant image to a predetermined value to determine the integrity of the display.

We claim:

1. An apparatus for testing a display device of a receiver capable of displaying a plurality of display patterns, comprising:
   transmitting means for transmitting a control program to the receiver to produce the plurality of display patterns including a reference display pattern on the display device;
   controlling means for controlling the receiver for displaying the plurality of display patterns and at least one measuring means for measuring the plurality of display patterns of the receiver, the measuring means comprising a means for transferring images of the plurality of display patterns including the reference display pattern to the controlling means, said controlling means further includes a comparing means for comparing the image of the reference display pattern with the images of the plurality of display patterns for determining the integrity of the display device.

2. The apparatus according to claim 1 wherein the controlling means comprises a micro-computer coupled to the receiver.

3. The apparatus according to claim 2 wherein the micro-computer is coupled to the receiver via an RS-232 link.

4. The apparatus according to claim 2 wherein the micro-computer is coupled to the receiver transmits a program to the receiver for controlling the receiver.

5. The apparatus according to claim 2 wherein the micro-computer is coupled to an image digitizer for digitizing an image of the display device.

6. The apparatus according to claim 1 wherein the measuring means comprises at least one camera coupled to a micro-computer for providing an image of the display device.

7. The apparatus according to claim 6 wherein the at least one camera is coupled to the micro-computer via an RS-170 link.

8. The apparatus according to claim 7 wherein the RS-170 link is first coupled to an image digitizer coupled to the micro-computer.

9. The apparatus according to claim 1 wherein the receiver comprises a selective call receiver.

10. The apparatus according to claim 1 wherein the measuring means includes a high-frequency florescence lighting source for providing an adequate and an evenly distributed back-ground light.

11. The apparatus according to claim 1 wherein the measuring means comprises at least one camera for taking an image of the reference display pattern and at least one image of the plurality of display patterns.

12. The apparatus according to claim 11 wherein the reference display pattern comprises a blank display pattern.

13. The apparatus according to claim 11 wherein the display patterns comprises a plurality of preselected patterns.

14. The apparatus according to claim 1 wherein the controlling means includes a means for transferring a control program into the receiver for generating the reference display pattern and the plurality of display patterns and for synchronizing the displaying of reference display patterns and the plurality of display patterns with the measuring means.

15. The apparatus according to claim 1 wherein the comparing means includes a means for computing a difference of the image of the reference display pattern and the images of the plurality of display patterns for determining the integrity of display device.

16. The apparatus according to claim 15 wherein the comparing means includes a means for computing an absolute value of the difference of the image of the reference display pattern and the image of at least one of the plurality of display patterns.

17. The apparatus according to claim 16 wherein the determining means comprises a means for computing a contrast, a size, and a position of a plurality of illuminated patterns of the absolute value of the difference of images on the display device.

18. A test apparatus for testing a receiver having a display device, comprising:
 a micro-processor for controlling the receiver for producing a plurality of display patterns on the display device by transferring a program into the receiver via a coupling link, said plurality of display patterns includes a reference display pattern;
 at least one camera for providing an image of a blank display and an image of each of the plurality of display patterns; and
 means for comparing the images of the plurality of display patterns with the image of the reference display pattern wherein said image of the reference display comprises the image of the blank display, said microprocessor comprising:
 a digitizer coupled to the at least one camera for digitizing the images;
 means for computing a difference of the image of the blank display and the image of the plurality of display patterns; and
 means for comparing the computed difference to a pre-determined value corresponding to that displayed pattern for determining the integrity of that display device.

19. A method for testing a receiver having a display device, comprising the steps of:
 (a) displaying a plurality of display patterns including a reference pattern on the display device;
 (b) measuring the plurality of display patterns and producing an image thereof in response to step (a);
 (d) comparing the images of the plurality of display patterns with the image of the reference pattern; and
 (e) computing a value in response to step (d) for determining the integrity of the display device.

20. The method for testing the display device according to claim 19 wherein the receiver is controlled by transferring a control program into the receiver for generating the reference pattern and the plurality of display patterns and for synchronizing the display device.

21. The method for testing the display device according to claim 19 wherein the images of the plurality of display patterns and the image of the reference pattern are provided by at least one camera.

22. The method for testing the display device according to claim 21 wherein the images of the plurality of the display patterns and the image of the reference pattern are digitized and a difference of the images are computed for determining the integrity of the display device.

23. The method for testing the display device according to claim 22 wherein an absolute value of the difference of the image of the reference pattern and each of the images of the plurality of display patterns are computed to for determining the integrity of the display device.

24. The method for testing the display device according to claim 23 wherein a contrast, a size, and a position of a plurality of illuminated patterns are computed from the absolute value of the difference between the image of the reference pattern and the images of the plurality of the display patterns.

25. The method for testing the display device according to claim 24 wherein the computed absolute value of the difference is compared with a pre-determined value corresponding to that display device.

26. A test apparatus for testing a selective call receiver having a display device capable of displaying a plurality of display patterns, comprising:
 a micro-computer for controlling the selective call receiver for producing the plurality of display patterns on the display by transferring a program into the selective call receiver via a coupling link, said plurality of display patterns includes a reference pattern;
 at least one camera for providing an image of a blank display corresponding to the reference pattern and an image of at least one of the plurality of display patterns; and
 means for measuring the plurality of display patterns and the reference pattern of the selective call receiver, said microcomputer comprising:
 a digitizer coupled to the at least one camera for digitizing the images;
 means for computing a difference of the image of the blank display and at least one of the image of the display pattern; and
 means for comparing the computed difference to a pre-determined value corresponding to that displayed pattern for determining the integrity of that display device.

* * * * *

UNITED STATES PATENT AND TRADEMARK OFFICE
CERTIFICATE OF CORRECTION

PATENT NO. : 5,175,772

DATED : December 29, 1992

INVENTOR(S) : Peter A. Kahn, Arthur P. Lafond, Frank E. Fedak

It is certified that error appears in the above identified patent and that said Letters Patent is hereby corrected as shown below:

Column 6, line 7, delete "(d)" and insert --(c)--.

Column 6, line 10, delete "(e)" and insert --(d)--.

Signed and Sealed this

Eighth Day of March, 1994

Attest:

BRUCE LEHMAN

Attesting Officer     Commissioner of Patents and Trademarks